United States Patent
Wang et al.

(10) Patent No.: US 10,222,829 B2
(45) Date of Patent: Mar. 5, 2019

(54) SYSTEMS AND METHODS TO COOL MOBILE DEVICE USING THERMOELECTRIC COOLER

(71) Applicant: LENOVO (SINGAPORE) PTE. LTD., New Tech Park (SG)

(72) Inventors: Song Wang, Cary, NC (US); Jian Li, Chapell Hill, NC (US); Jason Matteson, Raleigh, NC (US); Ming Qian, Cary, NC (US); Jianbang Zhang, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 532 days.

(21) Appl. No.: 14/963,846

(22) Filed: Dec. 9, 2015

(65) Prior Publication Data
US 2017/0172009 A1    Jun. 15, 2017

(51) Int. Cl.
*H02J 7/02*    (2016.01)
*G06F 1/16*    (2006.01)
*G06F 1/20*    (2006.01)

(52) U.S. Cl.
CPC .............. *G06F 1/1632* (2013.01); *G06F 1/20* (2013.01); *H02J 7/025* (2013.01)

(58) Field of Classification Search
CPC ...................................................... H02J 7/025
USPC ................................................ 320/108, 115
See application file for complete search history.

(56) References Cited

U.S. PATENT DOCUMENTS

| | | | |
|---|---|---|---|
| 2008/0024992 A1* | 1/2008 | Pflueger | H05K 7/20 361/705 |
| 2014/0062392 A1* | 3/2014 | Lofy | H05K 7/20845 320/108 |

* cited by examiner

*Primary Examiner* — Richard V Muralidar
(74) *Attorney, Agent, or Firm* — John L. Rogitz; John M. Rogitz (57) ABSTRACT

In one aspect, a device includes a processor and storage accessible to the processor. The storage bears instructions executable by the processor to determine that a trigger regarding an apparatus has been satisfied and, in response to the determination, activate a thermoelectric cooling element (TCE) accessible to the processor.

21 Claims, 10 Drawing Sheets

SYSTEMS AND METHODS TO COOL MOBILE DEVICE USING THERMOELECTRIC COOLER

FIELD

The present application relates generally to cooling devices using thermoelectric coolers.

BACKGROUND

As recognized herein, many people use their mobile devices to perform tasks they previously performed using a laptop or desktop computer. However, as also recognized herein, often times these mobile devices do not have enough space within them to incorporate a cooling fan or heat sink to dissipate excessive heat generated by the mobile device when performing these tasks, and hence many mobile devices operating under these conditions are not sufficiently cooled and can become inoperable or suffer performance issues when affected by the excessive heat.

SUMMARY

Accordingly, in one aspect a device includes a processor and storage accessible to the processor. The storage bears instructions executable by the processor to determine that a trigger regarding an apparatus has been satisfied and, in response to the determination, activate a thermoelectric cooling element (TCE) accessible to the processor.

In another aspect, a method includes activating a thermoelectric cooler and cooling a mobile device using the thermoelectric cool.

In still another aspect, a device includes a processor, a transceiver accessible to the processor, and storage accessible to the processor. The storage bears instructions executable by the processor to determine that a criterion regarding the device is satisfied and, in response to the determination, issue a command via the transceiver to a thermoelectric cooler for the thermoelectric cooler to activate.

In yet another aspect, a first device includes a wireless charger that changes a second device different from the first device and a thermoelectric cooler that cools the second device.

The details of present principles, both as to their structure and operation, can best be understood in reference to the accompanying drawings, in which like reference numerals refer to like parts, and in which:

DETAILED DESCRIPTION

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wire. Such connections may wireless communication connections including infrared and radio.

In an example, a processor can access information over its input lines from data storage, such as the computer readable storage medium and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used other embodiments in any appropriate combination. For example, any of the various components described herein and/or depicted in the Figures may be combined, interchanged or excluded from other embodiments.

"A system having at least one of A, B, and C" (likewise "a system having at least one A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
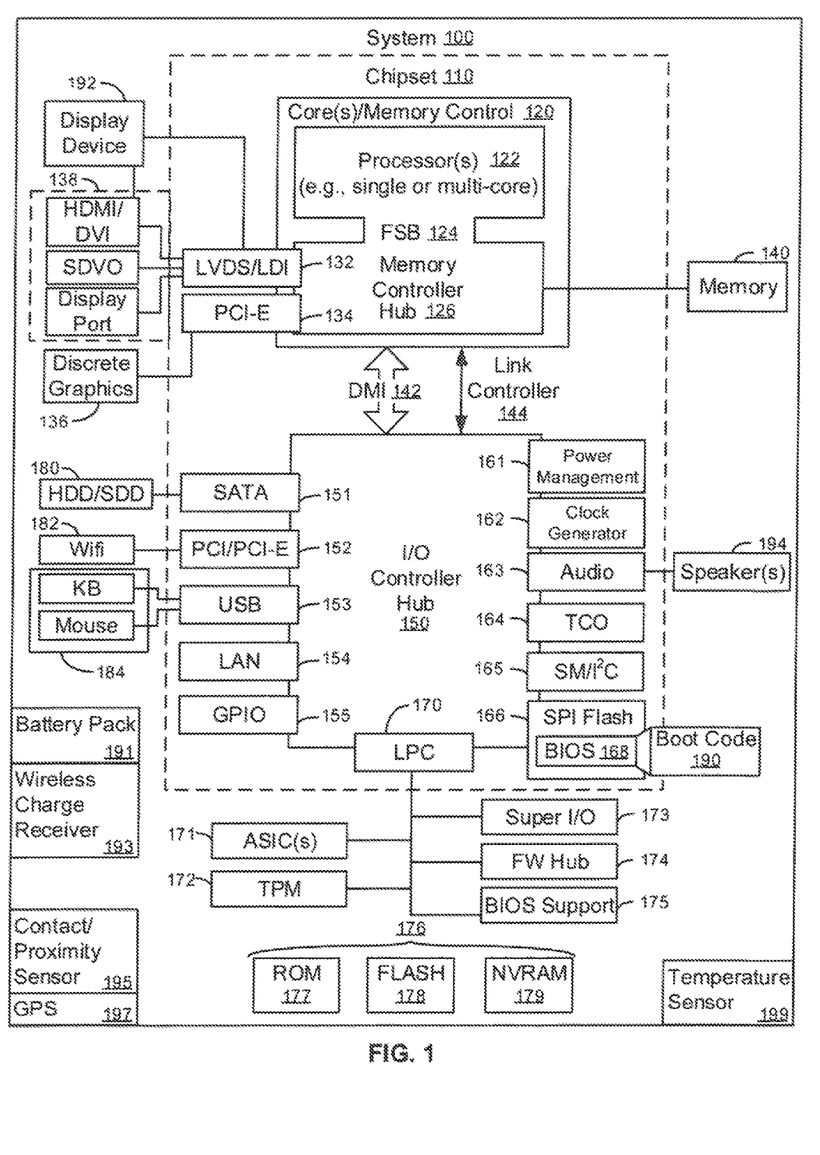
FIG. 1 is a block diagram of an example system in accordance with present principles.

Now specifically in reference to FIG. 1 an example block diagram of an information handling system and/or computer system 100 is shown. Note that some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX® or Playstation®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a cord and memory control group 120 and an I/O controller hub 150 that exchange information (e.g., data, signals, commands, etc.) via, for example, a direct management interface or direct media interface (DMI) 143 or a link controller 144. In the example of FIG. 1, the DMI 142 is a chip-to-chip interface (sometimes referred to as being a link between a "northbridge" and a "southbridge").

The core and memory control group 120 include one or more processors 22 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage, differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 120 also includes one or snore PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally s network interface for communication over at least one network such as the Internet, a WAN, a LAN, etc. under direction of the processor(s) 122), a general purpose I/O interface (GPIO) 155, s low-pin count (LPC) interface 170, a power management interface 161, a clock generator interface 162, an audio interface 163 (e.g., for speakers 194 to output audio), a total cost of operation (TCO) interface 164, a system management bus interlace (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information one or more drives 180 such as HDDs, SDDs or a combination thereof, but in any case the drives 180 are understood to be, e.g., tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Furthermore, the system 100 may also include at least one battery pack 191 comprising at least one battery. The battery pack 191 is electrically coupled to and powers the system 100, and is also electrically coupled to at least one wireless charge receiver 193 that is configured for receiving a wireless charge in accordance with present principles via an electromagnetic field from a wireless charge transmitter (not shown) using, e.g., inductive wireless charging principles and/or resonant inductive coupling principles. Thus, the receiver 193 may comprise at least one coil, as may the wireless charge transmitter. The coil on the receiver 193 may comprise at least one wire disposed around a magnet, and is configured for receiving power from the wireless charge transmitter, when the transmitter is activated, via the electromagnetic field created by the transmitter. The receiver 193 may also include at least one circuit configured for receiving current from the coil in the receiver 193 and providing current to the battery pack 191 to charge at least one battery in the pack 191 in accordance with present principles. This circuit may be comprised of one or more of a converter(s), a regulator(s), and/or a communicators).

The system 100 may also comprise a contact and/or proximity sensor 195 for sensing contact and/or proximity of the system 100 with another device in accordance with present principles, such as a wireless charger. The contact and/or proximity sensor(s) 195 may include, e.g., a touch sensor, a touch-enabled display, a touch-enabled pad, a motion sensor, a piezo-based contact sensor, a force sensing resistor (FSR), a sonar proximity sensor, an ultrasonic proximity sensor, a radar proximity sensor, an infrared (IR) proximity sensor, a laser rangefinder, an optical proximity sensor, and/or another type of sensor useful by the system 100 to determine whether it is proximate to, operatively coupled to, and/or in contact with another device in accordance with present principles.

A GPS transceiver 197 may also be included on the system 100 and used to determine, e.g., the location of the system 100 and whether the system 100 is proximate to and/or in contact with another device in accordance with present principles. Thus, the GPS transceiver 197 is configured to receive geographic position information from at least one satellite and provide the information to the processor 122. Notwithstanding the foregoing, it is to be understood that another suitable position receiver other than a GPS receiver may be used in accordance with present principles.

Further still, the system 100 may include at least one temperature sensor 199 for sensing a temperature of the system 100 and/or the battery pack 191 and providing input regarding the temperature (e.g., temperature measurements) to the processor 122. In some embodiments, plural temperature sensors 199 may be located at various locations within the system 100 and used in accordance with present principles.

Additionally, though now shown for clarity, in some embodiments the system 100 may include a gyroscope that senses and/or measures the orientation of the system 100 and provides input related thereto to the processor 122, an accelerometer that senses acceleration and/or movement of the system 100 and provides input related thereto to the processor 122, an audio receiver/microphone that provides input to the processor 122 based on audio that is detected, such as via a user providing audible input to the microphone, and a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video.

It is to be understood that an example client device or other machine/computer may include fewer or more features than shown on the system 100 of FIG. 1. In any case, it is to be understood at least based on the foregoing that the system 100 is configured to undertake present principles.

Figure 2:
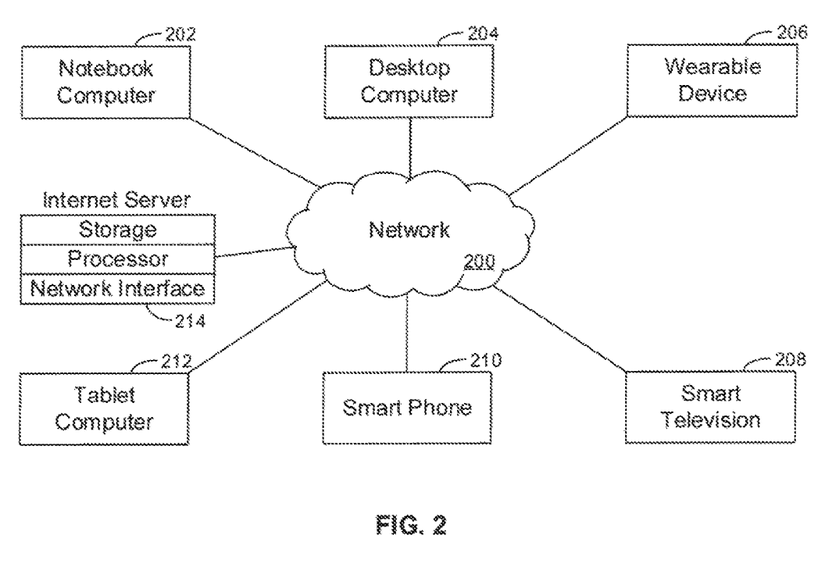
FIG. 2 is a block diagram of a network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
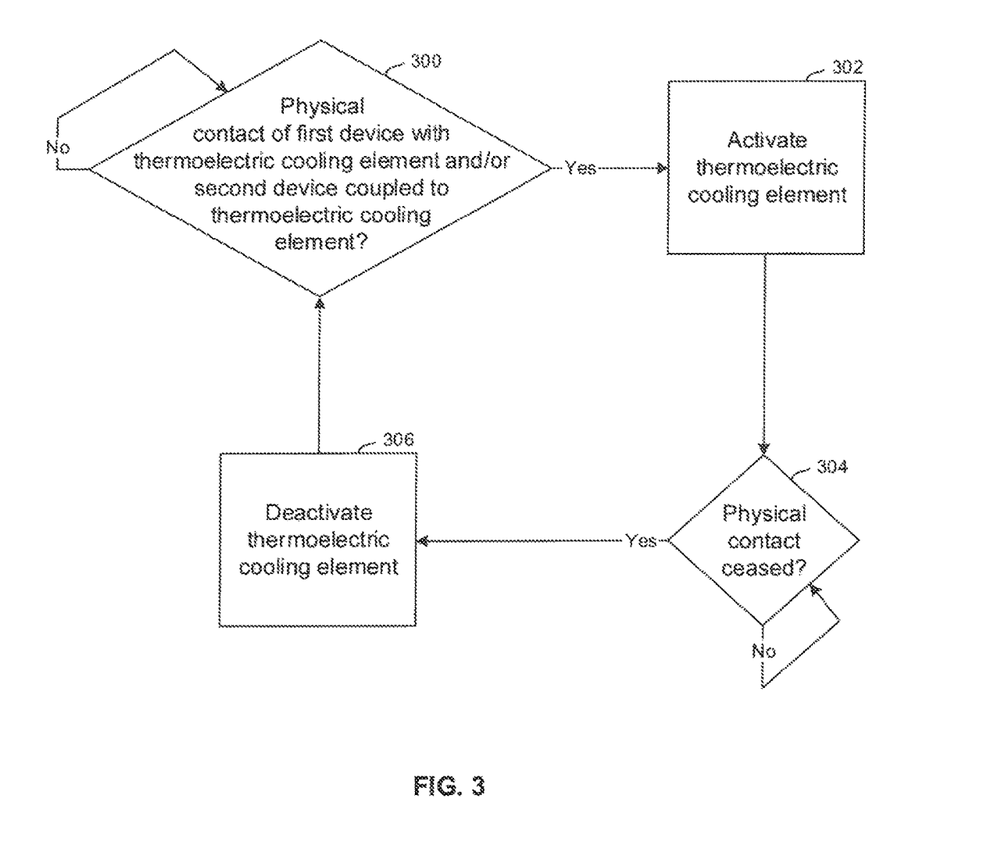
FIGS. 3-7 are flow charts showing example algorithms in accordance with present principles.

Referring to FIG. 3, it shows example logic that may be executed by a device such as the system 100, a mobile device, a thermoelectric cooling pad/element (TCE), a docking station, and/or a wireless charger in accordance with present principles for deferral whether criterion and/or trigger has been satisfied for activating a TCE. Thus, it is to be understood that the logic of FIG. 3 may be executed by the mobile device, by the TCE, and/or a second device that controls the TCE and to which the TCE coupled.

Beginning at decision diamond 300, the logic determines whether the mobile device is operatively coupled to and/or in physical contact and/or proximity (e.g., within a threshold distance) of the TCE or the second device coupled to the TCE (referred to below as the "TCE/second device" for simplicity), and/or is otherwise placed within a wireless charging area of the second device at which the mobile device may receive a wireless battery charge in embodiments where a wireless charger terms part of the second device. The determination at diamond 300 may be based on input from a contact sensor and/or proximity sensor (such as the sensor(s) 195 described above) on one or both of the mobile device and ICE/second device that is processed to determine whether contact and/or proximity with another device is sensed.

In addition to or in lieu of the foregoing, physical contact of the mobile device with the TCE/second device may be determined based on a comparison of GPS coordinates from a GPS transceiver on the mobile device regarding the current location of the mobile device to GPS coordinates from a GPS transceiver on the TCE/second device regarding the current location of the TCE/second device to thus identify whether the coordinates are the same, at least substantially the same, and/or indicative of the mobile device and TCE/second device being at least proximate to each other.

Still further, in some embodiments, near field communication (NFC) between the mobile device and TCE/second device using respective NFC cards on each device may be used to determine and/or communicate location information for the mobile device and TCE/second device to thus determine whether they are in physical contact with each other, as may be Bluetooth communication using Bluetooth transceivers on each device and radio frequency identification (RFID) communication using respective RFID cards on each device. In some embodiments, the communication signals received by one of the mobile device and TCE/second device from the other respective device may be analyzed using received signal strength identification (RSSI) principles, algorithms, and methods to identify a strength of the received signals and correlate the strength to a distance to the device from which the signals were received to thus identify whether the mobile device and TCE/second device are touching or at least proximate to each other based on the distance.

In any case, and still in reference to diamond 300, note that if the logic makes a negative determination thereat, the logic may continue making this determination at diamond 300 until an affirmative determination is made. Then, responsive to an affirmative determination at diamond 300, the logic may proceed to block 302 where the logic activates the TCE, such as by transmitting a command to the TCE for the TCE to activate from a standby mode (or off mode) and to begin cooling the mobile device that is proximate and/or contacting it. From block 302 the logic may then proceed to decision diamond 304. At diamond 304 the logic determines whether physical contact of the mobile device with the TCE/second device has ceased, as may be determined using methods similar to those described above in reference to diamond 300, mutatis mutandis.

If the logic makes a negative determination at diamond 304, the logic may continue making this determination at diamond 304 while the TCE remains activated to cool the mobile device and until an affirmative determination is made. Then, responsive to an affirmative determination at diamond 304, the logic may proceed to block 306 where the logic deactivates the TCE, such as by transmitting a command to the TCE for the TCE to deactivate and again enter the standby mode (or off mode). From block 306 the logic may then revert back to decision diamond 300 and proceed therefrom.

Figure 4:
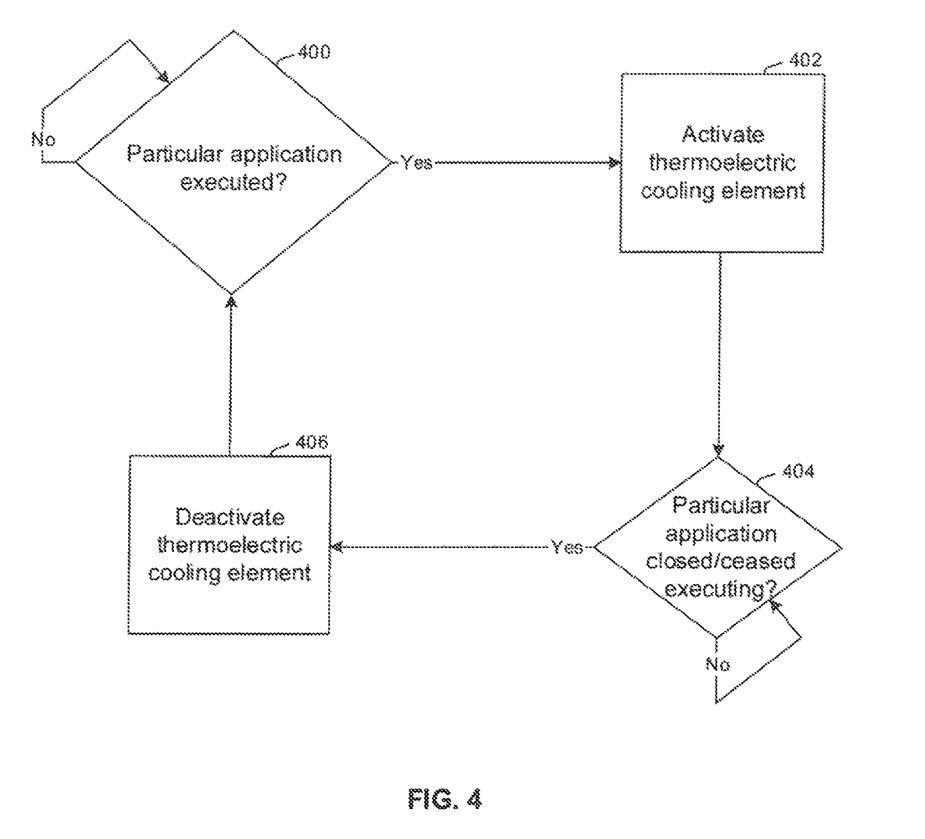

Moving on to the description of FIG. 4, it also shows example logic that may be executed by a device such as the system 100, a mobile device, a thermoelectric cooling element (TCE), a docking, station, and/or a wireless charger in accordance with present principles for determining whether a criterion and or trigger has been satisfied for activating a TCE. It is to be understood that the logic of FIG. 4 may be executed by the mobile device in some example embodiments to cool the mobile device, but also that it may be executed by the TCE and/or a second device that controls the TCE and to which the TCE coupled in other example embodiments.

Beginning at decision diamond 400, the logic determines whether a particular application stored at the mobile device has been selected for initiation/launch, whether the particular application has been initiated/launched, and/or whether the particular application is currently executing at the mobile device. The particular software application to be monitored by the logic may be established by an administrator or user, e.g., by providing input to a user interface (UI) to select the particular application. The particular application that is selected by the administrator or user may be, for example, a word processing application that typically consumes an amount of processor and battery resources that causes the mobile device to heat up.

In any case, the determination at diamond 400 may be done by the logic by accessing, e.g., a list of currently executing processes maintained by the mobile device and determining whether the particular application is on the list. In other embodiments the logic may identify that processor resources are being consumed to execute the particular application and hence determine that the particular application is running.

Still in reference to diamond 400, note that if the logic makes a negative determination thereat, the logic may continue making this determination at diamond 400 until an affirmative determination is made. Then, responsive to an affirmative determination at diamond 400 (and/or responsive to selection and/or launch of the particular application itself), the logic may proceed to block 402 where the logic activates the TCE.

From block 402 the logic may proceed to decision diamond 404. At diamond 404 the logic determines whether the particular application has been closed and/or has ceased executing, as may be determined using methods similar to those described above in reference to diamond 400, mutatis mutandis. If the logic makes a negative determination at diamond 404, the logic may continue making this determination at diamond 404 while the TCE remains activated (e.g., to cool the mobile device) and until an affirmative determination is made. Then, responsive to an affirmative determination at diamond 404, the logic may proceed to block 406 where the logic deactivates the TCE. From block 406 the logic may then revert back to decision diamond 400 and proceed therefrom.

Figure 5:
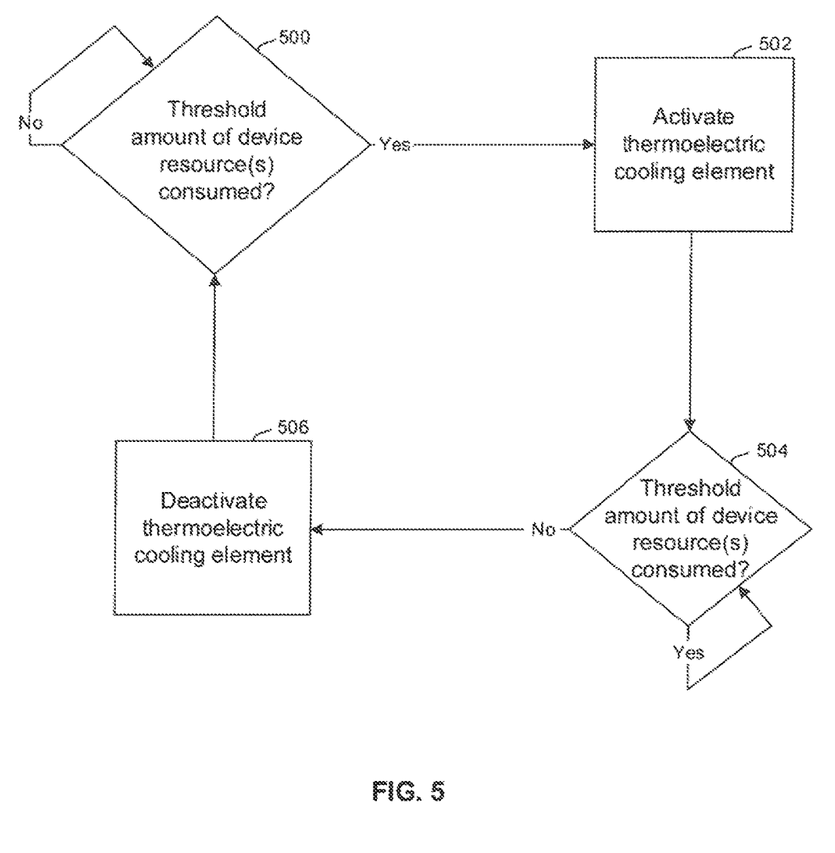

Continuing now in reference FIG. 5, another example is shown of logic that may be executed by a device such as the system 100, a mobile device, a thermoelectric cooling element (TCE), a docking station, and/or a wireless charger in accordance with present principles for determining whether a criterion and/or trigger has been satisfied for activating a TCE. It is to be understood that the logic of FIG. 5 may be executed by the mobile device in some example embodiments to cool the mobile device, but also that it may be executed by the TCE and/or a second device that controls the TCE and to which the TCE coupled in other example embodiments.

Beginning at decision diamond 500, the logic determines whether a threshold amount of one or more mobile device resources (e.g., processor resources, RAM, battery power, etc.) are being consumed by the mobile device, such as to execute software applications. The threshold(s) to be used by the logic may be established by an administrator or user, e.g., providing input to a user interface (UI) to establish the threshold(s) at a particular level.

The determination at diamond 500 may be done by the logic by accessing, e.g., a list of currently executing processes and respective amounts of resources being consumed by each one (e.g., as maintained by the mobile device) to determine whether the threshold(s) is met, and/or by accessing a list (e.g., as maintained by the mobile device) indicating total amounts of device resources being consumed to then determine whether the threshold(s) is met. In addition to or in lieu of the foregoing, the logic may analyze in real time the amount of device resources being consumed and determine whether the threshold(s) is met based on that.

Still in reference to diamond 500, note that if the logic makes a negative determination thereat, the logic may continue making this determination at diamond 500 until an affirmative determination is made. Then, responsive to an affirmative determination at diamond 500, the logic may proceed to block 502 where the logic activates the TCE.

From block 502 the logic may proceed to decision diamond 504. At diamond 504 the logic determines whether the threshold(s) is still met and/or whether the threshold amount(s) of the mobile device resource(s) is still being consumed, as may be determined using methods similar to those described above in reference to diamond 500, mutatis mutandis. If the logic makes an affirmative determination at diamond 504, the logic may continue making this determination at diamond 504 while the TCE remains activated (e.g., to cool the mobile device) and until a negative determination is made. Then, responsive to a negative determination at diamond 504, the logic may proceed to block 506 where the logic deactivates the TCE. From block 500 the logic may then revert back to decision diamond 500 and proceed therefrom.

Figure 6:
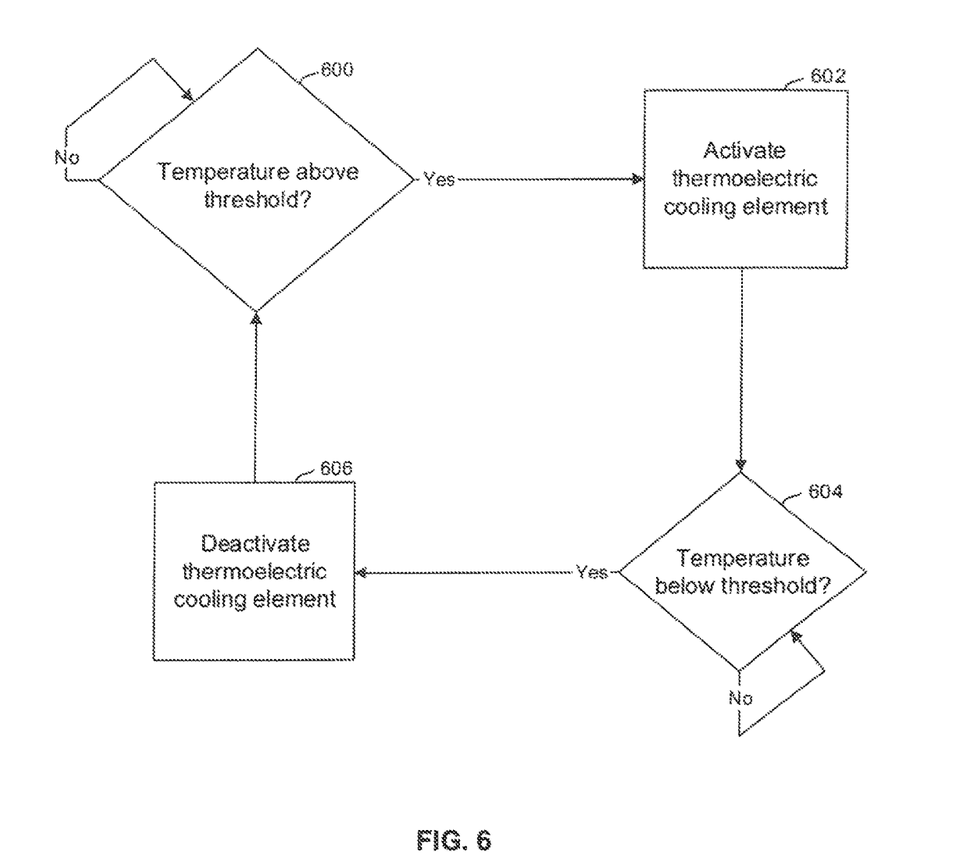

Moving on, reference is now made to FIG. 6, which shows yet another example of logic that may be executed by a device such as the system 100, a mobile device, a thermoelectric cooling element (TCE), a docking station, and/or a wireless charger in accordance with present principles for determining whether a criterion and/or trigger has been satisfied for activating a TCE. It is to be understood that the logic of FIG. 6 may be executed by the mobile device in some example embodiments to cool the mobile device, but also that it may be executed by the TCE and/or a second device that controls the TCE and to which the TCE coupled in other example embodiments.

Beginning at decision diamond 600, the logic determines whether a temperature of at least a portion of the mobile device has reached a temperature threshold. The temperature threshold that is used by the logic may be established by an administrator or user, e.g., by providing input to a user interface (UI) to establish the threshold at a particular temperature.

The determination at diamond 600 may be done by the logic by processing input from one or more temperature sensors on the mobile device to determine whether one or more measured temperatures is above or below the threshold temperature. For example, input may be received from a temperature sensor within a battery pack of the mobile device (e.g., if battery temperature is to be monitored), from a temperature sensor juxtaposed along an inner well of the mobile device's housing, and/or from a temperature sensor on the TCE (or device coupled to the TCE) that is juxtaposed to sense the temperature of the mobile device when the mobile device is in contact therewith.

Still in reference to diamond 600, note that if the logic makes a negative determination thereat, the logic may continue making this determination at diamond 600 until an affirmative determination is made. Then, responsive to an affirmative determination at diamond 600, the logic may proceed to block 602 where the logic activates the TCE.

From block 602 the logic may proceed to decision diamond 604. At diamond 604 the logic determines whether the measured temperature(s) of at least a portion of the mobile device has fallen below the temperature threshold, as may also be determined using input from the temperature sensor(s) discussed above. If the logic makes a negative determination at diamond 604, the logic may continue making this determination at diamond 604 while the TCE remains activated (e.g., to cool the mobile device) and until an affirmative determination is made. Then, responsive to an affirmative determination at diamond 604, the logic may proceed to block 606 where the logic deactivates the TCE. From block 606 the logic may then revert back to decision diamond 600 and proceed therefrom.

Figure 7:
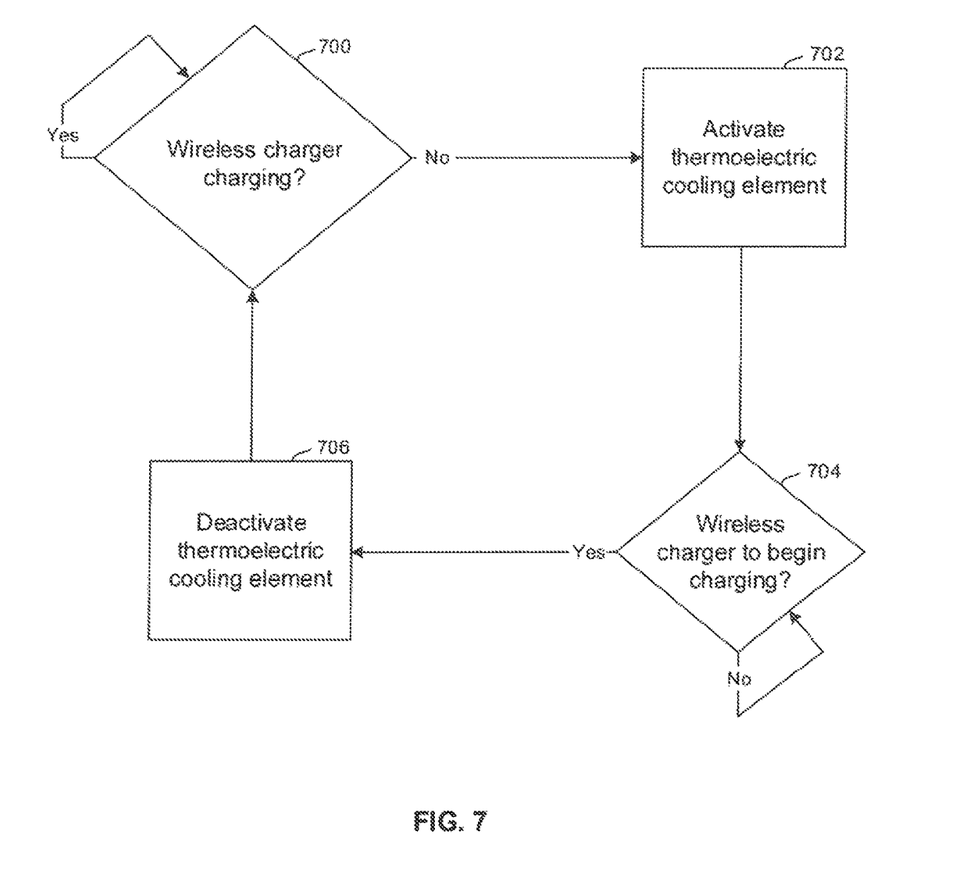

FIG. 7 will now be described. It shows still another example of logic that may be executed by a device such as the system 100, a mobile device, a thermoelectric cooling element (TCE), a docking station, and/or a wireless charger in accordance with present principles for determining whether a criterion and/or trigger has been satisfied for activating a TCE. Thus, it is to be understood that the logic of FIG. 7 may be executed by the mobile device, and/or by the TCE, and/or a second device that controls the TCE and to which the TCE coupled.

Beginning at decision diamond 700, the logic determines whether a wireless charger for wirelessly charging the mobile device has been activated, whether user input has been received to activate the wireless charger, and/or whether the wireless charger is currently charging the mobile device. The determination at diamond 700 may be done by the logic, e.g., based on a determination that the wireless charger is on or in an activated mode, based on communication with the wireless charger in which the wireless charger provides an indication that it is activated and/or functioning and/or based on a determination that at least one battery in the mobile device is receiving a wireless charge.

Still in reference to diamond 700, note that if the logic makes an affirmative determination thereat, the logic may continue making this determination at diamond 700 until a negative determination is made. Then, responsive to a negative determination at diamond 700 (and/or responsive to the wireless charger being deactivated from providing a wireless charge, and/or responsive to receipt of a signal from the wireless charger that the wireless charger has been deactivated from providing a wireless charge that was generated in response to a determination by the wireless charger that the mobile device has reached a threshold high temperature while receiving the wireless charge), the logic may proceed to block 702 where the logic activates the TCE.

From block 702 the logic may proceed to decision diamond 704. At diamond 704 the logic determines whether the wireless charger is to begin and/or has already begun wirelessly charging the mobile device's battery again (and/or has otherwise been activated again to provide a wireless charge), as may be determined using methods similar to those described above in reference to diamond 700, mutatis mutandis. If the logic makes a negative determination at diamond 704, the logic may continue making this determination at diamond 704 while the TCE remains activated (e.g., to cool the mobile device) and until an affirmative determination is made. Then, responsive to an affirmative determination at diamond 704 (and/or responsive to the wireless charger again being activated to provide a wireless charge), the logic may proceed to block 706 where the logic deactivates the TCE. From block 706 the ionic may then revert back to decision diamond 700 and proceed therefrom.

Continuing now in reference to FIGS. 8-15, various embodiments of devices in accordance with present principles will be shown. It is to be understood that the thermoelectric cooling elements, devices, and/or pads (referenced as a "TCE" below) that are to be described may contain processors, storage, one or more communication interfaces (e.g., wired and/or wireless), etc. for undertaking present principles. Notwithstanding, it is to also be understood that the other devices mechanically coupled to and/or controlling the such as the wireless/wired chargers and docking stations described below (and even the mobile device itself in embodiments where it controls the TCE), may also contain processors, storage, one or more communication interfaces (e.g., wired and/or wireless), etc. for undertaking present principles (e.g., for controlling the TCE to activate and deactivate it).

Figure 8:
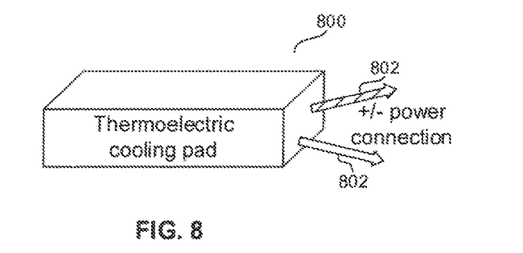
FIGS. 8-15 are block diagrams of example devices in accordance with present principles.

First describing FIG. 8, it shows a TCE 800 along with example arrows 802 representing positive and negative connections to a power source for powering the TCE 800.

The TCE 800 is understood to be configured to undertake present principles, and therefore is understood to have contact sensors, temperature sensors, etc., for determining whether a mobile device has been placed on top of it and should be cooled in accordance with present principles. The exposed surface area of the TEC 800 may be made of one or more electrically nonconductive materials that are nonetheless still thermally conductive, such as various ceramics and plastics. The TEC 800 itself may vary in size, e.g., depending on the size of the mobile device it is to cool so that when laid flat on the TCE 800, an entire area of at least one outer side of the mobile device may contact the TEC 800.

Figure 9:
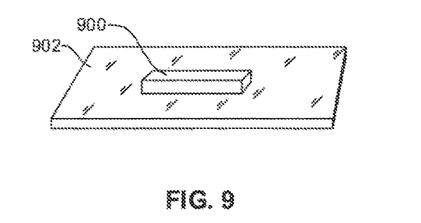

However, in some embodiments and as may be appreciated from FIG. 9, a TEC 900 in accordance with present principles (e.g., that may be a least substantially similar in function and configuration to the TEC 800) may be coupled to a metal panel 902 (e.g., made of copper). The panel 902 may provide an increased surface area (of a thermally conductive surface) that may place into contact with, or abut, a mobile device to cool it when it is itself cooled b the TEC 900 to in turn cool the mobile device placed on the panel 902. Note that the TEC 900 and panel 902 combination is shown upside down in FIG. 9 for illustration, but that be turned right side up for use so that the TEC 900 may be placed on a table or desk and the panel 902 may face upward for a mobile device to be placed on it.

Figure 10:
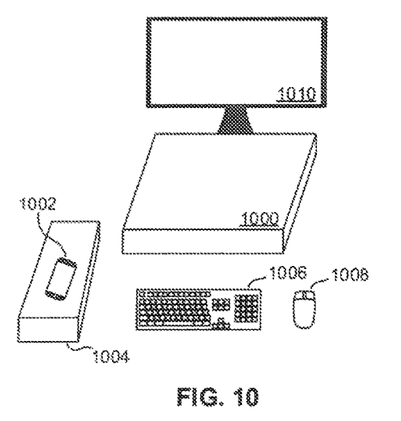

Now in reference to FIG. 10, another example embodiment is shown. A docking station 1000 may communicate with both a mobile device 1002 and a TEC 1004 (e.g., that may be substantially in function and configuration to the TEC 800 described above) that cools the mobile device 1002 while the mobile device 1002 is in contact with the TEC 1004 as shown. The docking station 1000 may include items such as a processor, storage, and one or more communication interfaces, and may also communicate with peripheral devices such as a keyboard 1006, a mouse 1008, a display 1010, etc. Even though the TEC 1004 is shown separate from the docking station 1000, it is to be understood that the two may communicate to undertake present principles.

Figure 11:
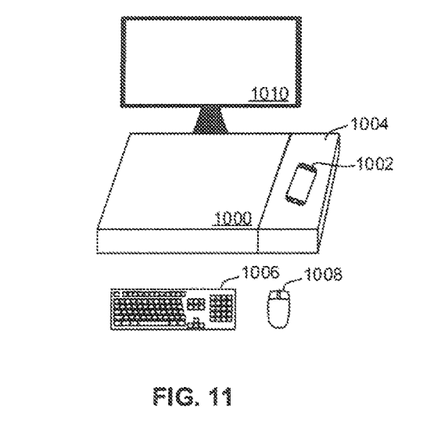

However, as shown in FIG. 11, in some embodiments the TEC 1004 may be coupled to and/or integrated with the docking station 1000. For example, the TEC 1004 and/or an element coupled to it for cooling the device (such as the panel 902 described above) may be juxtaposed on the docking station 1000 so that, while the mobile device 1002 is engaged with the docking station 1000 for the mobile device 1002 to use the docking station's items and resources for enhanced computing, the TEC 1004 may thermally influence the mobile device 1002 from at least one side to cool the mobile device. Furthermore, it is to be understood that in some examples, the TEC 1004 may also have a wireless (and/or wired) charger incorporated therein, and this the mobile device when engaged with the docking station 1000 may be both wirelessly charged by the wireless charger in the TEC 1004 and cooled by the cooling component(s) of the TEC 1004. Also, though not shown for clarity, in example embodiments the portion the docking station 1000 bearing the TEC 1004 may have alignment indicators positioned thereon that indicate a location and juxtaposition of the mobile device 1002 for placement thereat to receive a wireless charge and be cooled.

Figure 12:
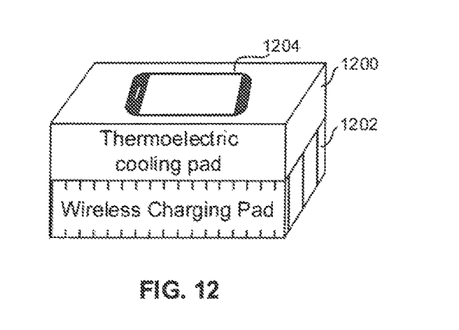

Continuing the detailed description in reference to FIG. 12, mother example embodiment is shown, this time with a TEC 1200 (e.g., that may be substantially similar in function and configuration to the TEC 800 described above) coupled to a wireless (and/or wired) charging pad 1202 that may wirelessly charge the mobile device 1204 when the mobile device 1204 is placed in contact with and/or on top of the TEC 1200 as shown. Note that in some embodiments, interference may exist between the wireless charging pad 1202 while providing a charge to the mobile device 1204 and the TEC 1200 while cool the mobile device 1204 and accordingly the wireless charging pad 1202 may be activated while the TEC 1200 is deactivated, and the TEC 1200 may be activated while the wireless charging pad 1202 is deactivated, to help minimize any such interference. Thus, for example, the logic if FIG. 7 may be employed by the mobile device 204, TEC 1200, and/or pad 1202 in this embodiment, as well as the embodiments shown in FIGS. 13 and 14. In any case, it is to be further understood that for more-effective wireless charging of the mobile device 1204 by the pad 1202, in some embodiments electrically nonconductive cooling portions of the TEC 1200 (but not other components of the TEC 1200) may be juxtaposed between the pad 1202 and location on the TEC 1200 on which the mobile device 1204 is to be placed so that the pad 1202 may more-effectively influence a wireless charge receiver on the mobile device 1204 to provide a wireless charge.

Figure 13:
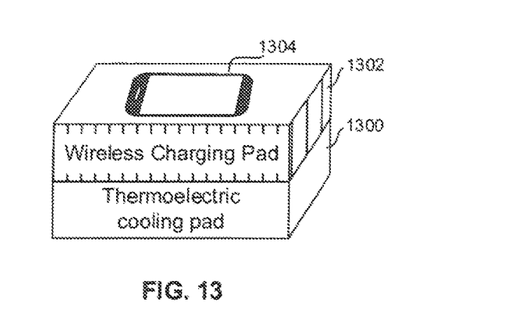

Now in reference to FIG. 13, it shows another embodiment of a TEC and wireless charger combination in accordance with present principles. A TEC 1300 is shown (e.g., that may be substantially similar in function and configuration to the TEC 800 described above) coupled to a wireless charging pad 1302 that may wirelessly charge the mobile device 1304 when the mobile device 1304 is placed in contact with and/or on top of the pad 1302 as shown. By coupling the pad 1302 on top of the TEC 1300 so that the mobile device 1304 rests on the pad 1302, the risk of interference may be lessened while the TEC 1300 may nonetheless cool the mobile device 1304 by first cooling the pad 1302, which in turn cools the mobile device 1304.

Figure 14:
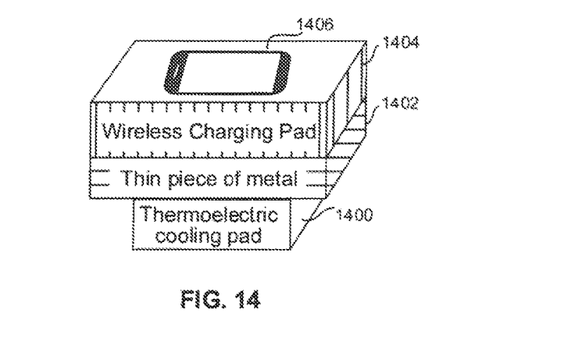

Moving on to FIG. 14, yet another example embodiment of a TEC and wireless charger combination is shown. A TEC 1400 (e.g., may be substantially similar in function and configuration to the TEC 800 described above) may be coupled to a thin metal panel 1402 (e.g., that may be substantially similar in function and configuration to the panel 902 described above). The panel 1402 may in turn be coupled to a wireless charging pad 1404 that may wirelessly charge the mobile device 1406 when the mobile device 1406 is placed in contact with and/or on top of the pad 1404 as shown. By coupling the pad 1404 on top of the TEC 1400 and panel 1402 so that the mobile device 1406 rests on the pad 1404, the risk of wireless charge interference may be lessened while the TEC 1400 may nonetheless cool the mobile device 1406 by cooling the increased surface area (e.g., relative to the upper panel of the pad 1400) of the panel 1402, which in turn cools the pad 1404, which in turn cools the mobile device 1406.

Figure 15:
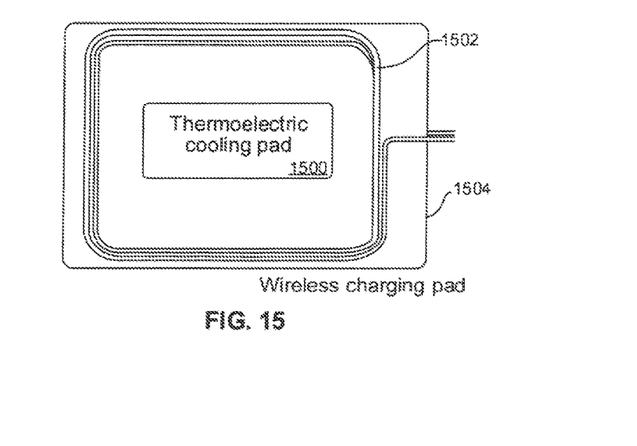

Continuing the detailed description in reference to FIG. 15, it shows block diagram of an example cooling element 1500 of a thermoelectric cooling pad (e.g., that may be substantially similar in function and configuration to the TEC 800 described above) in accordance with present principles. The cooling element 1500, which may be thermally conductive to cool a mobile device in accordance with present principles, may be placed inside of a coil 1502 of a wireless charger 1504. By placing the element 1500 inside the windings of the coil 1502, a TEC/wireless charger combination may be used in which, e.g., at least some space is conserved and the risk of interference may be lessened.

Figure 16:
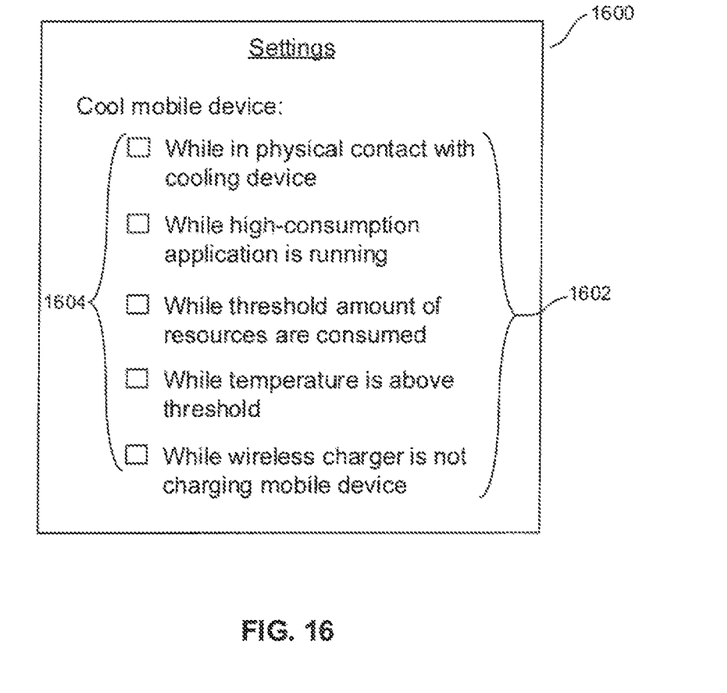
FIG. 16 is an example user interface (UI) in accordance with present principles.

Now in reference to FIG. 16, it shows an example user interface (UI) 1600 that may be presented on a display accessible to and/or on a mobile device, and/or accessible to another device undertaking present principles. The UI 1600 lists plural options 1602 that are respectively selectable by a user by providing input to respective check boxes 1604. As may be appreciated from the UI 1600, respective options are presented that are selectable using corresponding boxes 1604 to automatically without further user input configure the device presenting the UI 1600 to control a TEC to cool a mobile device while the mobile device is in physical contact with the cooling device, while a high-resource-consuming application is executing at the mobile device, while a threshold amount of the mobile device's resources are being consumed, while at least one temperature of the mobile device is above a temperature threshold and while a wireless charger is not charging the mobile device.

Generally, it is to be understood that a thermoelectric cooling element, pad, device, etc. in accordance with present principles may include a capacitor and/or other elements to create a heat flux between different types of materials in the TEC and thus transfer heat from one side of the TEC to another depending on a direction of an electric current that is applied. It is to also be understood that the side of the TEC to which heat is directed (e.g., the bottom side of the TEC 1004 described above that is opposite to the side on which the mobile device 1002 is placed) while the other side cools a mobile device may comprise and/or have coupled thereto (e.g., via a wireless charge receiver or docking station) one or more fans (e.g., propelling heat toward an opening in the TEC and/or device to which the TEC is coupled), one or more heat spreaders (e.g., moving heat from the TEC to a heat sink), etc. to dissipate heat that accumulates at that side to the outside environment (e.g., the air).

Furthermore, it is to be understood that present principles may be applied for not just devices such as smart phones and tablet computers, but also for laptop computers, desktop computers, wearable devices, etc.

Before concluding, it is to also be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

While the particular SYSTEMS AND METHODS TO COOL MOBILE DEVICE USING THERMOELECTRIC COOLER is herein shown and described in detail, it is to be understood that the subject matter which is encompassed by the present application is limited only by the claims.

What is claimed is:

1. A first device, comprising:
 a processor; and
 storage accessible to the processor and bearing instructions executable by the processor to:
 determine that a trigger regarding an apparatus has been satisfied; and
 in response to the determination, activate a thermoelectric cooling element (TCE) accessible to the processor;
 wherein the trigger comprises a wireless charger not wirelessly charging the apparatus;
 wherein the first device comprises the TCE and the wireless charger, wherein the apparatus is different from the first device; and
 wherein at least part of a cooling portion of the ICE is disposed within a coil of the wireless charger.

2. The first device of claim 1, wherein the trigger comprises that the apparatus is operatively coupled to the TCE.

3. The first device of claim 1, comprising a docking station coupled to the TCE.

4. The first device of claim 1, wherein the trigger comprises a particular application being executed at the apparatus.

5. The first device of claim 1, wherein the trigger comprises at least a threshold amount of resources of the apparatus first device being used.

6. The first device of claim 1, wherein the trigger comprises temperature of the apparatus reaching a temperature threshold.

7. A method, comprising:
 activating thermoelectric cooler; and
 cooling a mobile device using the thermoelectric cooler;
 wherein the method comprises activating the thermoelectric cooler in response to cessation of wireless charging, using a wireless charger coupled to the thermoelectric cooler, of the mobile device.

8. The method of claim 7, comprising:
 presenting a graphical user interface (GUI) on a display, the GUI comprising an option that is selectable to configure the thermoelectric cooler to be activated responsive to at least one criterion being met.

9. The method of claim 8, wherein the GUI is a GUI for configuring one or more settings related to use of the thermoelectric cooler.

10. The method of claim 7, comprising:
 activating the thermoelectric cooler responsive to identification of a temperature of a battery pack in the mobile device reaching a temperature threshold, the identification being based on input from a temperature sensor inside the battery pack.

11. A device, comprising:
 at least one processor;
 a transceiver accessible to the at least one processor; and
 storage accessible to the at least one processor and comprising instructions executable by the at least one processor to:
 determine that a criterion regarding the device is satisfied, the criterion comprising that a particular software application is being executed, the determination being based on identification of the particular software application from a list of currently-executing processes; and
 in response to the determination, issue a command via the transceiver to a thermoelectric cooler for the thermoelectric cooler to activate.

12. The device of claim 11, wherein the particular software application s a won processing application.

13. The device of claim 12, wherein the word processing application is selected by a user prior to the determination.

14. The device of claim 11, wherein the instructions are executable by the at least one processor to:
 present a graphical user interface (GUI) on a display, the GUI comprising an option that is selectable to configure a setting for the thermoelectric cooler to be activated responsive to the particular software application being executed.

15. The device of claim 11, wherein the instructions are executable by the at least one processor to:
 issue a command for the thermoelectric cooler to activate responsive to identification of a temperature of a battery pack reaching a temperature threshold, the identification being based on input from a temperature sensor inside the battery pack.

16. An apparatus, comprising:
   storage that is not a transitory signal, the storage comprising instructions executable by the at least one processor to:
   determine that a criterion regarding a device is satisfied, the criterion comprising at least a threshold amount of resources of the device being consumed, the resources pertaining to at least one of: processor resources, battery power, and random access memory (RAM); and
   responsive to the determination, issue a command to a thermoelectric cooler for the thermoelectric cooler to activate.

17. The apparatus of claim 16, wherein the thermoelectric cooler cools the device while the thermoelectric cooler activated.

18. The apparatus of claim 16, wherein the resources pertain at least to processor resources.

19. The apparatus of claim 16, wherein the resources pertain at least to battery power.

20. The apparatus of claim 16, wherein the resources pertain at least to RAM.

21. The apparatus of claim 16, wherein the instructions are executable by the at least one processor to:
   present a graphical user interface (GUI) on a display, the GUI comprising an option that is selectable to configure a setting for the thermoelectric cooler to be activated responsive to at least one criterion being met.

* * * * *